(12) United States Patent
Leung (10) Patent No.: US 7,266,657 B2
(45) Date of Patent: Sep. 4, 2007

(54) DATA PROTECTION DEVICE AND METHOD OF SECURING DATA

(76) Inventor: Kwok-Yan Leung, 53 Applegate Cres, Willowdale, ON (CA) M2H 2R5

( * ) Notice: Subject to any disclaimer, the term of this patent is extended or adjusted under 35 U.S.C. 154(b) by 400 days.

(21) Appl. No.: 10/974,870

(22) Filed: Oct. 27, 2004

(65) Prior Publication Data

US 2006/0090052 A1    Apr. 27, 2006

(51) Int. Cl.
*G06F 12/16* (2006.01)
(52) U.S. Cl. .................................... 711/162
(58) Field of Classification Search ................ 711/112, 711/162, 163; 714/6, 42
See application file for complete search history.

(56) References Cited

U.S. PATENT DOCUMENTS

| | | | |
|---|---|---|---|
| 5,559,993 A * | 9/1996 | Elliott et al. ................. | 711/163 |
| 6,317,845 B1 * | 11/2001 | Meyer et al. .................. | 714/23 |
| 6,345,346 B1 * | 2/2002 | Biessener et al. ............ | 711/162 |
| 6,484,269 B1 * | 11/2002 | Kopylovitz ..................... | 714/5 |
| 6,502,205 B1 * | 12/2002 | Yanai et al. .................... | 714/7 |
| 6,591,376 B1 * | 7/2003 | VanRooven et al. .......... | 714/36 |
| 6,766,478 B2 | 7/2004 | Leung .......................... | 714/42 |
| 2005/0262334 A1 * | 11/2005 | Scudder ......................... | 713/1 |
| 2006/0253724 A1 * | 11/2006 | Zhang ........................... | 714/2 |

* cited by examiner

*Primary Examiner*—Kevin L. Ellis (57) ABSTRACT

A data protection device capable of securing data in a data storage device is disclosed, comprising a disk space allotment unit, a marking unit, and an archiving unit. The disk space allotment unit undertakes to reorganize multiple sectors in the data storage device for allotment of disk space to newly defined sections to be used in the present scheme, such as a working data section, a sector index table and a duplicate data section. The marking unit is to check and update the data flags in the sector index table when data are written into respective sectors of the working data section, where the data flag indicates whether the write status of certain sector is enabled. The archiving unit is to reverse the above process so as to restore the original data in the working data section and data flag in the sector index table.

16 Claims, 8 Drawing Sheets

DATA PROTECTION DEVICE AND METHOD OF SECURING DATA

BACKGROUND OF THE INVENTION

1. Field of the Invention

The present invention relates to a data protection device and a method of securing data, and in particular to a device installation that supports all types of storage media interface with higher data access rate and more efficient usage of disk space.

2. The Related Art

Conventional data protection is based on the hardware implementation of a data protection circuit, which is installed between a conventional hard disk interface and the data bus. For the operating system, the specially adapted hard disk is treated as a conventional hard disk, with no need of any driver programs. Data can be written directly into a data storage device without any driver programs. Therefore, the data access rate of the hard disk is not affected, only that the disk operation has become more secure.

However, there is a limitation to using the prior art data protection technique, which can only be used on the storage media interface that is invariably set for two IDE hard disks or logical drives. After assigning the disk space for the primary data area and the virtual data area, the disk space remaining is allotted to logical drives, which is the disk space that a user can utilize. But this prior art data protection technique cannot be used on newer generation of storage media interface cards that are often used on a single hard disk, such as SATA. Therefore, the operation mode and architecture of the prior art technique need to be adjusted to meet the requirements of current hard disk technology.

Another inherent weakness in the architecture and the operation mode of the prior art technique is that the allotment of disk space to the primary data area and the virtual data area has to be equal. Since the data address of the saved in a hard disk might not be contiguous, the one-to-one copying of the entire data block though easy to implement often is a waste of the disk space. Therefore, the overall data access rate is slowed down because of the unnecessary disk action on the non-data sectors.

Since the prior art technique adopts the one-to-one copying, the system can only perform inflexible data copying and data recovery, but such system cannot support multiple node data protection and multiple selection of data reference point for archiving and data restoration.

SUMMARY OF THE INVENTION

The primary objective of the present invention is to provide a data protection device that supports all types of storage media interface.

The secondary objective of the invention is to provide a data securing technique that makes use of data flags recorded in a sector index table to indicate the write status of certain sectors when data are written into certain sectors, whereby the disk space needed for archiving can be considerably reduced, and the overall data access rate can be shortened.

The third objective of the invention is to provide a data securing technique that enables users to define the data reference point for archiving and data restoration operations, such as certain hour or date, and supports multiple node data protection through overlapping data copying and restoration processes.

In accordance with the first aspect of the invention, the data protection device is composed of a disk space allotment unit, a marking unit and an archiving unit.

In accordance with the second aspect of the invention, the disk space allotment unit is to reorganize multiple sectors existing in the data storage device for allotment of disk space to newly defined sections, such as a working data section, a sector index table and a duplicate data section of the data protection device.

In accordance with the third aspect of the invention, the marking unit is to mark the data flag of a certain sector in the sector index table at the same time that data are written into the working data section, where the data flag is used to indicate whether the write status of certain sector is enabled.

In accordance with the fourth aspect of the invention, the archiving unit is to use the data flag of a certain sector marked in the sector index table to copy the data of respective sector from the working data section and associated data flag value from the sector index table to the duplicate data section.

In accordance with the fifth aspect of the invention, a data recovery unit is included in the data protection device, so that when some of the data saved in the data protection device are corrupted or the data storage device is attacked by computer viruses, the user is able to invoke the data recovery procedure to restore the original data in the working data section using the data copy from the duplicate data section.

In accordance with the sixth aspect of the invention, a disk space tracking unit is to collect updated information of disk space used so far and disk space still remaining in the working data section, the sector index table, and the duplicate data section.

In accordance with the seventh aspect of the invention, every time when the archiving unit or the data recovery unit is invoked, the disk space tracking unit is first consulted to obtain updated information about the disk usage in order to prevent overwriting of any valid data in the destination data section. Also, through the service of the disk space tracking unit, the user is able to obtain useful information about the disk usage in the working data section, the sector index table and the duplicate data section continuously for other applications.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
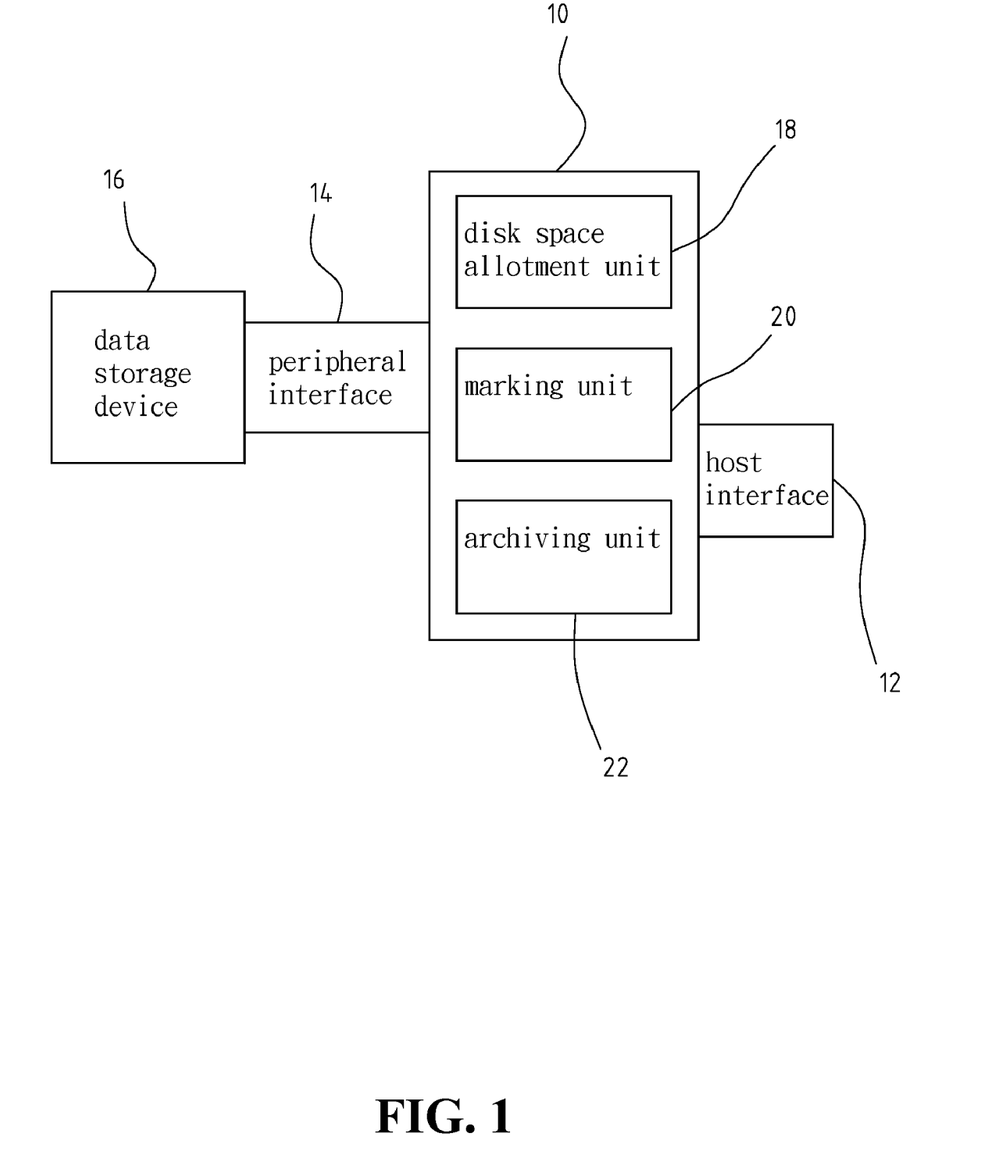
FIG. 1 is a block diagram of the first embodiment of the present invention.

Referring to FIG. 1, a data protection device 10 in the first preferred embodiment of the present invention is composed of a disk space allotment unit 18, a marking unit 20 and an archiving unit 22. Further, the data protection device 10 is connected by a host interface 12 to a data communication line (not shown), so that the operating system is able to access data saved in a data storage device 16 connected through a peripheral interface 14.

The data securing technique employed by the data protection device 10 in accordance with the present invention bears some resemblance to the prior art technique, such as the use of the conventional data copying and restoration procedures for manipulation of data in the data storage device, but the present invention has introduced the reallocation of the entire disk space on the storage device so as to achieve higher data access rate and more efficient usage of disk space, in which multiple sectors existing in the data storage unit 16 are first reorganized for allotment of disk space to newly defined sections, such as a working data section, a sector index table and a duplicate data section.

Figure 2:
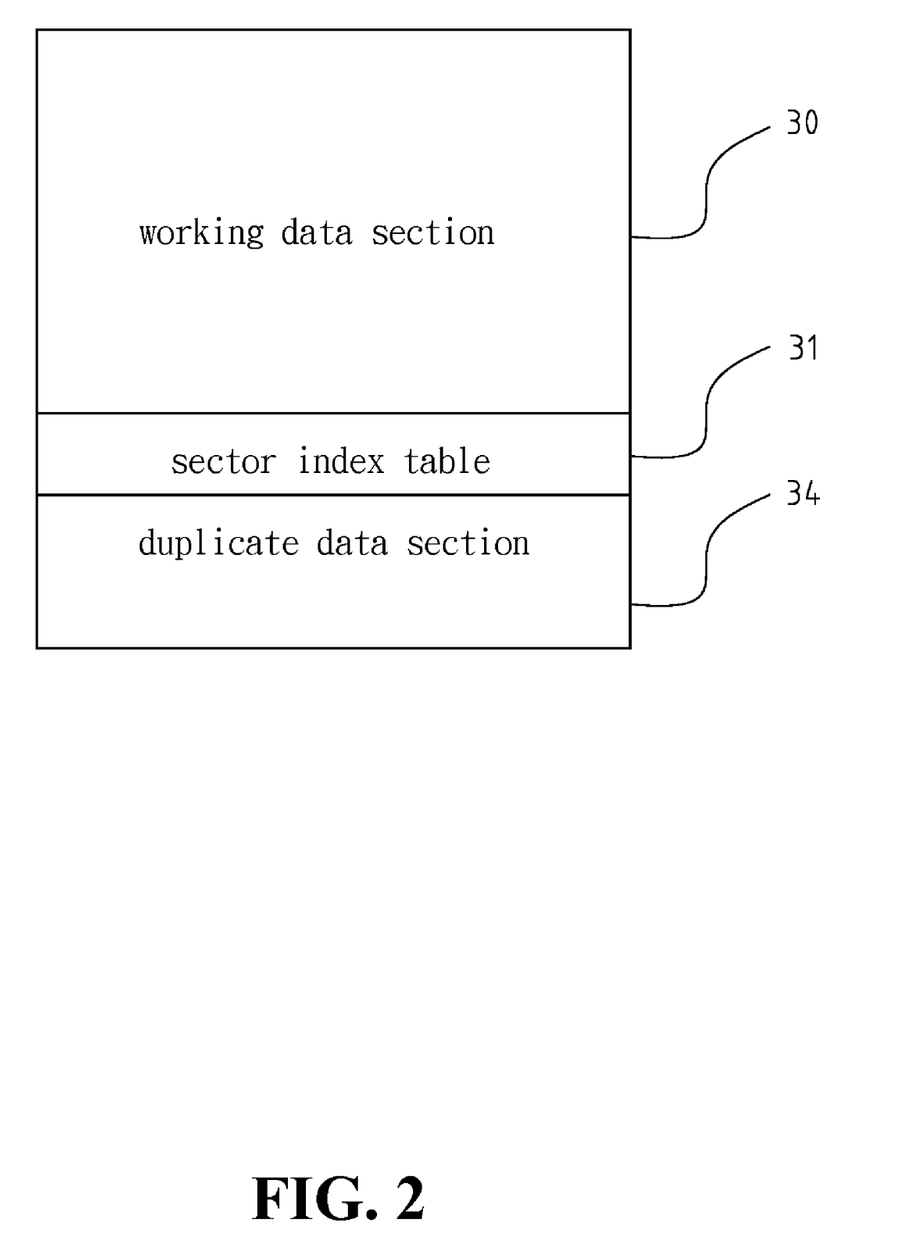
FIG. 2 is a disk space allotment diagram in accordance with the present invention.

Referring to FIG. 2, the disk space allotment for the working data section 30, sector index table 31 and duplicate data section 34 in accordance with the present invention is shown. The disk space allotment unit 18 is to implement the allotment instruction given by the user through an input device. The entire disk space of the data storage device 16 is reconstructed, that is multiple sectors on a hard disk are reorganized to create the working data section 30, the sector index table 31 and the duplicate data section 34. At the same time, the disk space allotted to each section is defined. It shall be noted that data manipulation in the working data section 30, the sector index table 31 and the duplicate data section 34 of the data protection device 10 still uses the conventional data read/write signals.

Figure 3:
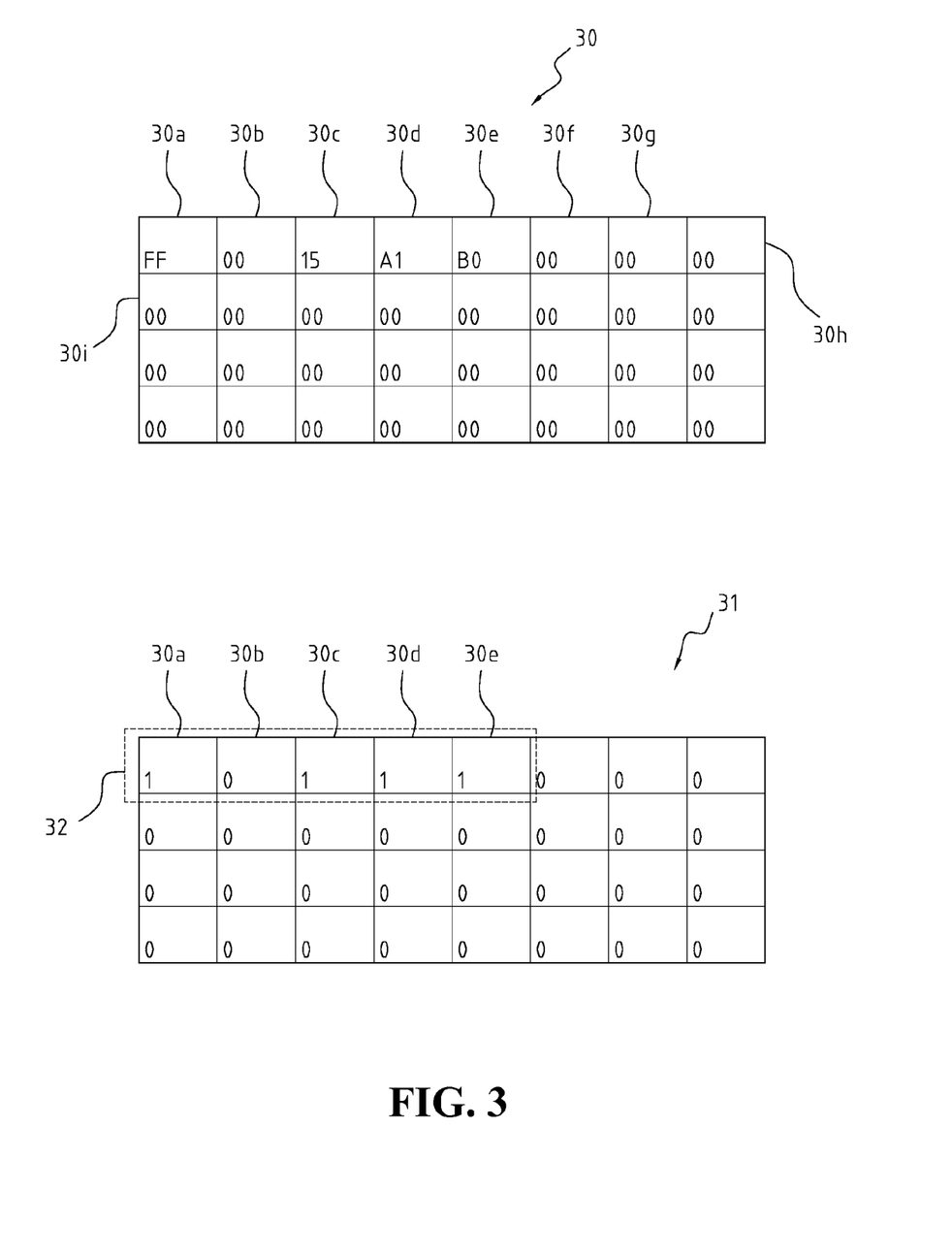
FIG. 3 is a diagram showing the data pattern in the working data section and respective data flags marked in the sector index table.

Referring to FIG. 3, the data pattern existing in the working data section and the sector index table is shown. The operating system has 'FF', '00', '15', 'A1', and 'B0' written into sectors 30A to 30E, while the sectors 30F to 30I are still empty at this point.

When the operating system is about to write data into a certain sector of the working data section 30, such as the data content in sector 30A, the marking unit 20 is to check and mark the data flag 32 in the sector index table, which indicates whether valid data are present in the sectors 30A to 30F. If the sector 30A has data content 'FF', then the data flag 32 of respective sector shall be marked as '1' indicating valid data are present in the sector 30A, but if the sector 30B does not have any data, the data flag 32 of respective sector in the sector index table 31 shall be marked as '0'.

Figure 4:
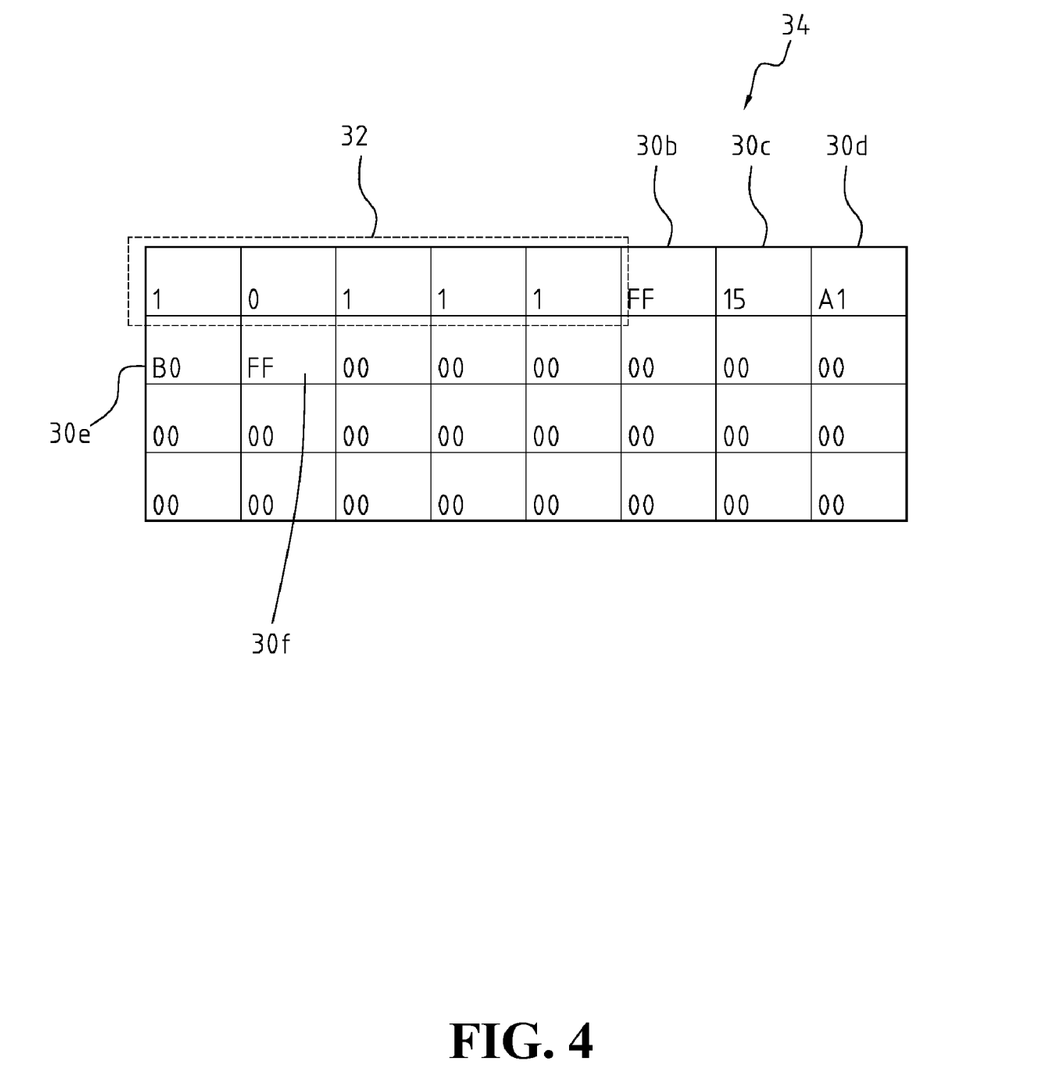
FIG. 4 is a diagram showing the data pattern in the duplicate data section being derived from the data patterns shown in FIG. 3.

Referring to FIG. 4, the data pattern in the duplicate data section is being derived from associated data pattern in the working data section and sector index table shown in FIG. 3. When the archiving procedure is invoked, the archiving unit 22 first checks the data flag 32 of a certain sector marked in the sector index table 31 before the data in the working data section 30 is copied to the duplicate data section 34, such as the sector 30B with data flag status '0' which indicates the sector 30B does not have any data, the archiving procedure will skip over the sector to the next one, thus one sector is saved for more meaningful data. The associated data flag value is also copied to the duplicate data section 34 as shown in FIG. 4, but it is not necessary to put the data flags 32 in front of regular data as demonstrated in the present example.

The present invention is characterized in that the disk space used by the working data section 30 and the duplicate data section 34 does not have to be equal, unlike the prior art technique. Since the storage media interface used by the data protection device 10 is not limited to supporting two disk drives, the present invention is able to support any type of storage media interface, so the number of disk drives being connected can be changed for different system configurations.

The marking unit 20 of the data protection device 10 is used to record the data flags 32 of all sectors used by the working data section 30 in the sector index table 31, so that, for example, sector 30B with no data shall be skipped over in the archiving procedure. This can also explain why the disk space used by the working data section 30 and the duplicate data section 34 does not have to be the same.

Figure 5:
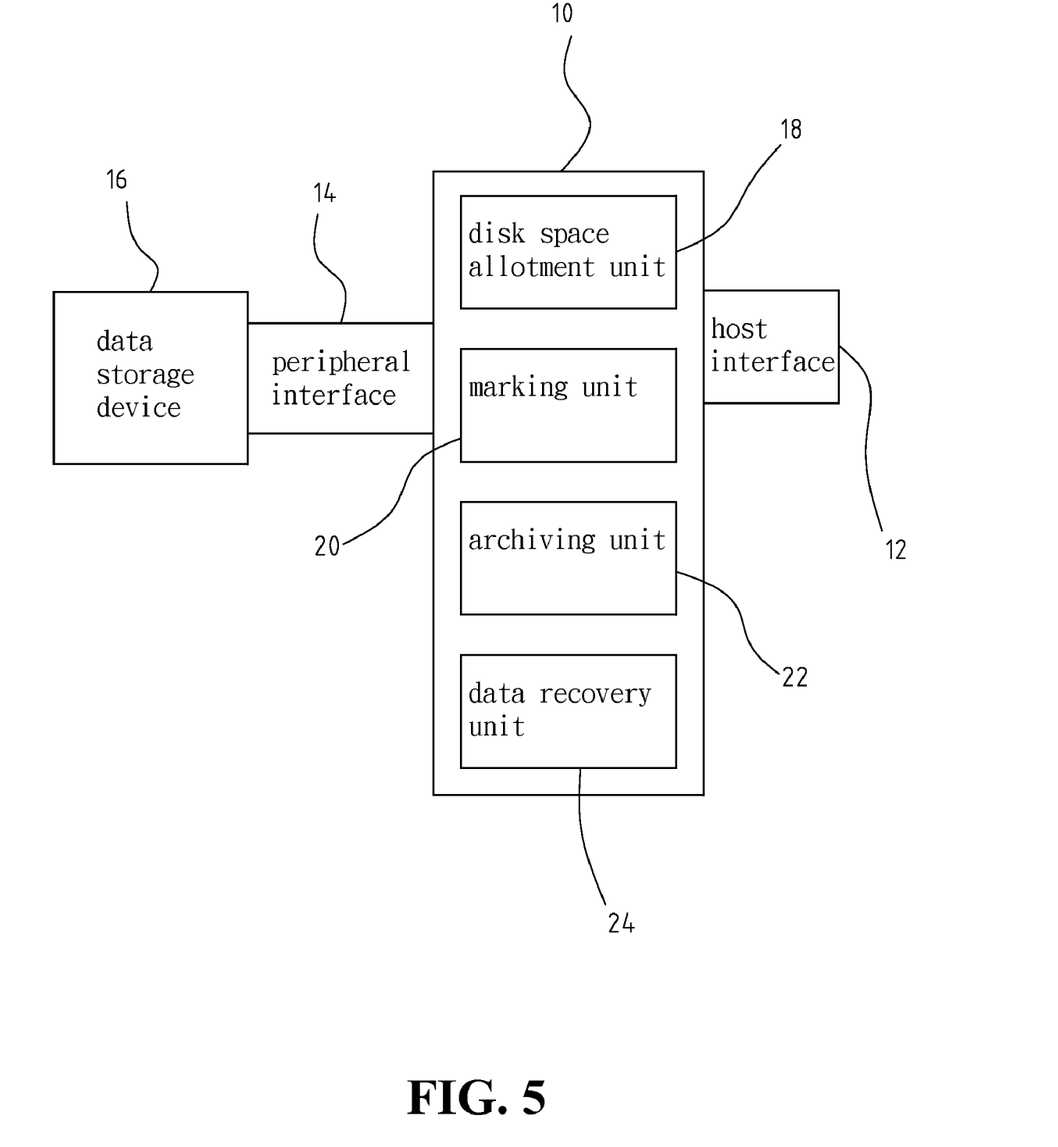
FIG. 5 is a block diagram of the second embodiment of the invention.

Referring to FIG. 5, the second embodiment of the invention is presented, in which a data recovery unit 24 is included in the data protection device 10. If some of the data saved in the data protection device 10 are corrupted or when the data storage device is attacked by a computer virus, the user is able to invoke the data recovery unit 24 to restore the original data in the working data section 30 using the data copy from the duplicate data section 34.

When the data recovery procedure is invoked, the data recovery unit 24 uses the data flags 32 of certain sectors marked in the sector index table 31 as shown in FIG. 4 to restore the data originally written in sectors 30A, 30C, 30D, and 30E of the working data section 30, using the data copy in the duplicate data section 34. Since the data flags 32 in the sector index table 31 indicate that the sector 30B does not have any data, the data recovery unit 24 shall fill the sector 30B of the working data section 30 with blank data '00' in the data recovery procedure.

Figure 6:
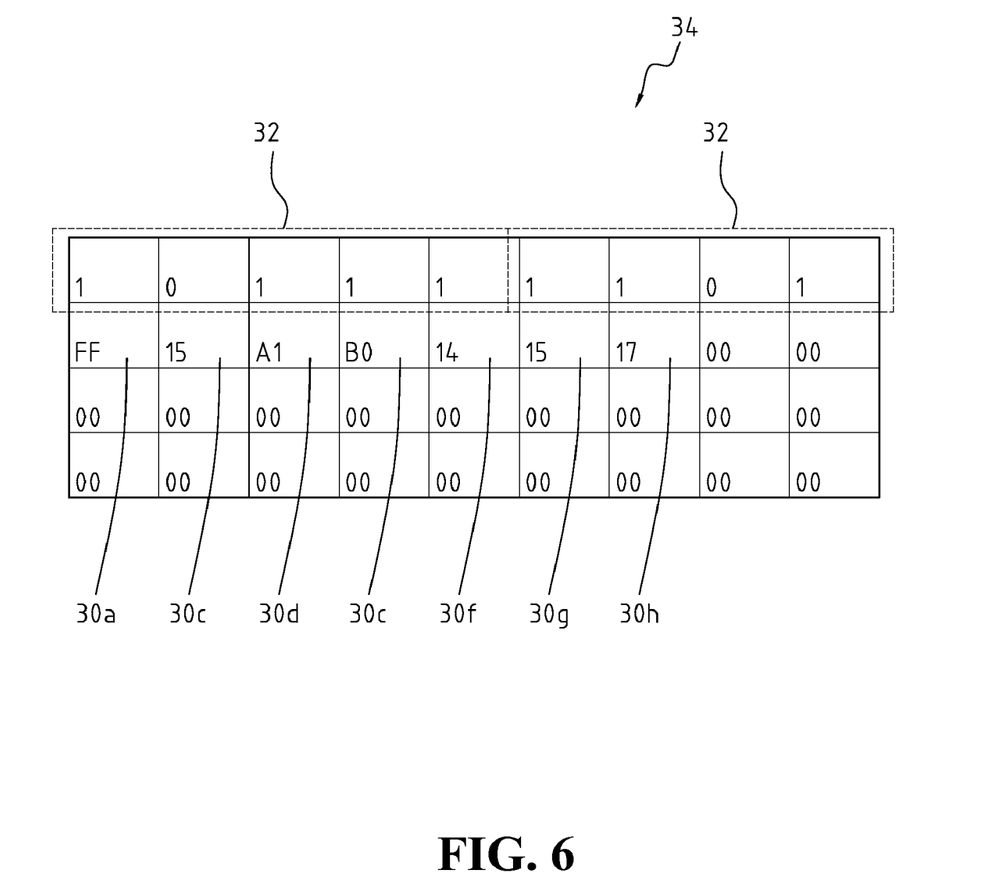
FIG. 6 is a block diagram of the third embodiment of the invention.

Referring to FIG. 6, the third embodiment of the invention is presented. If the data content in the sectors 30F to 30I of the working data section 30 is arranged as '14', '15', '00', and '17', that means the sector 30H does not have any data. In this case, the data flag 32 originally used in the first embodiment is to add a new data flag entry 40 with the data arrangement '1, 1, 0, 1'. Therefore, in case the user sets up another data protection node, the archiving unit 22 is first to check on the data flags 32, 40 in the sector index table 31 and then data saved in sectors 30A to 30I in the working data section 30 are copied to the duplicate data section 34, together with associated data flag values as shown in FIG. 6.

Using the same data manipulation, in the event of a computer disaster, data need to be restored to the working data section 30, the data recovery unit 24 is first to check on the data flags 32, 40 in the sector index table 31, and then respective data in the duplicate data section 34 are copied to the sectors 30A to 30I of the working data section 30, and the data in the working data section 30 before the disaster occurs. The data flags 32, 40 of the respective sectors are also restored to the original values in the sector index table 31.

Figure 7:
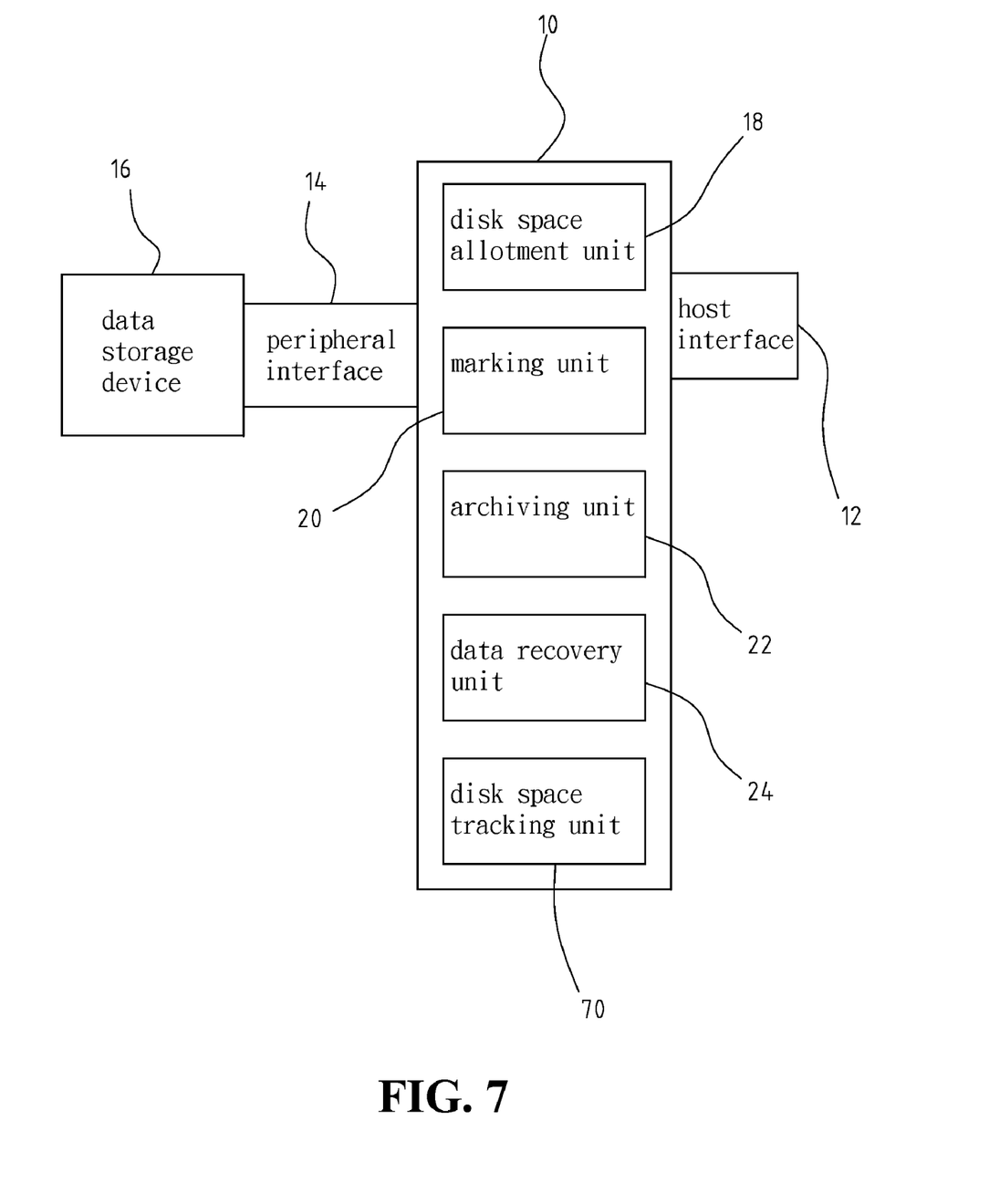
FIG. 7 is a block diagram of the fourth embodiment of the invention.

Referring to FIG. 7, the fourth embodiment of the invention is presented, in which a disk space tracking unit 70 is included in the data protection device 10. The function of the disk space tracking unit 70 is to collect updated information of remaining disk space and occupied disk space in the working data section 30, the sector index table 31, and the duplicate data section 34. Each time when the archiving unit 22 is invoked to copy data into the duplicate data section 34, the disk space tracking unit 70 is first to be consulted to obtain an updated information about the disk usage in order to prevent overwriting of any valid data. Also, through the service of the disk space tracking unit 70, the user is able to obtain useful information about the disk usage in the working data section 30, the sector index table 31 and the duplicate data section 34 continuously for other applications.

Figure 8:
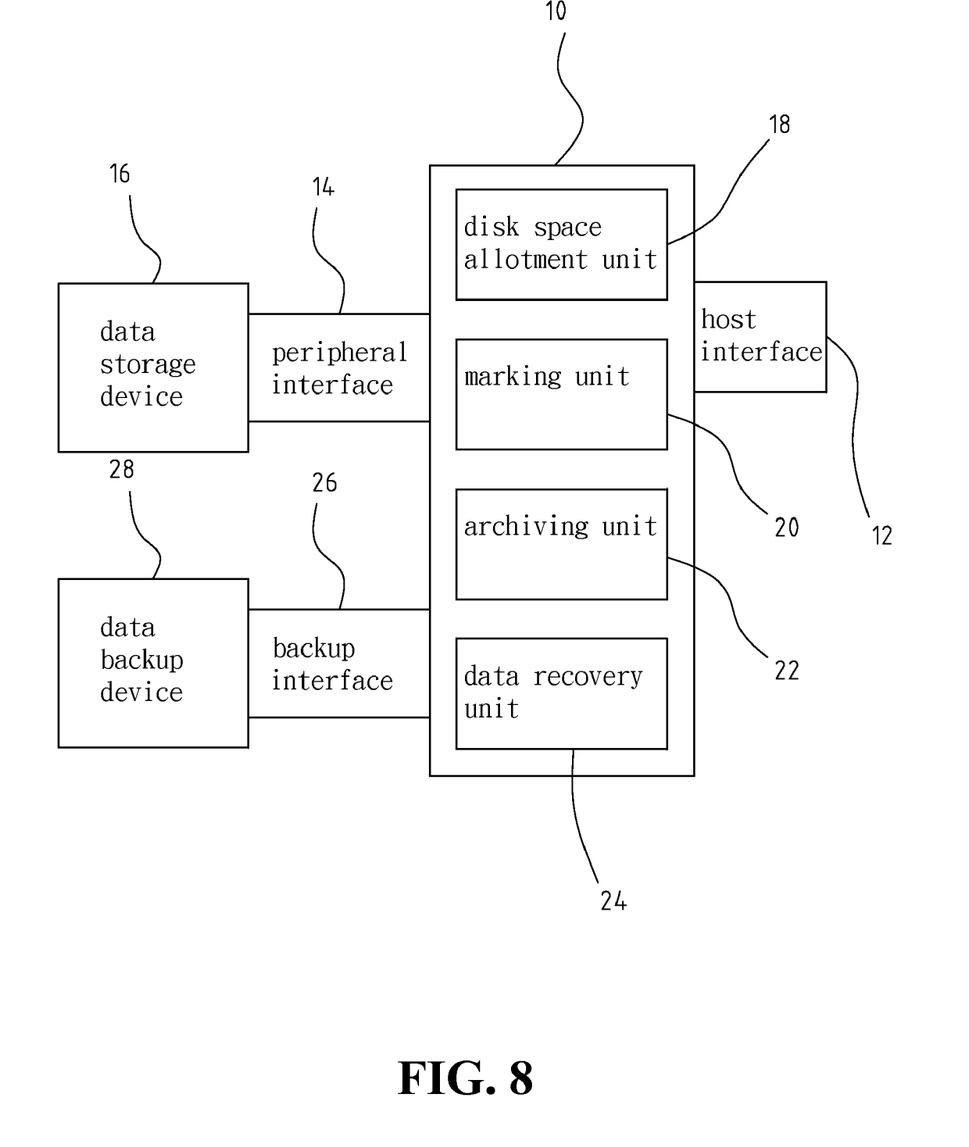
FIG. 8 is a block diagram of the fifth embodiment of the invention.

Referring to FIG. 8, the fifth embodiment of the invention is presented, in which a backup interface 26 is included in the data protection device 10. This backup interface 26 enables data line connection between the data protection unit 10 and the data backup device 28, so that the data protection unit 10 is able to retrieve data from the data backup device 28. In case the disk space allotment unit 18 has assigned multiple sectors of the data backup device 28 to the duplicate data section 34, the archiving unit 22 is able to use additional disk space on the data backup device 28.

The backup interface 26 is to use a suitable bus interface, such as the small computer system interface (SCSI), the fiber channel interface (FC), the peripheral component interconnect (PCI), the flash card interface, the serial storage architecture (SSA), the integrated device electronics (IDE), the universal serial bus (USB), IEEE 1394, the personal computer memory card international association (PCMCIA), serial ATA (SATA), and parallel ATA (PATA).

The data backup device 28 is to use a suitable storage medium, such as a hard disk, an optical disk burner, a ZIP disk drive, a MO disk drive, a tape drive, and a card reader. Therefore, the data backup device 28 can be replaceable storage media, which enables the user reference points, such as certain hour or date, for data copying and restoration operation. However, it shall be noted that the disk space in the duplicate data section 34 shall be adjusted each time after the storage medium in the data backup device 28 is replaced so as to reflect the disk space used thus far and the disk space still remaining.

This innovative use of a sector index table containing data flags in the present invention enables the user to use less access time and disk space usage to accomplish data archiving and data recovery. Also, another feature of the data protection device is a multi-node data protection using the multiple selection of data reference point.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A data protection device installable on a data storage device with multiple sectors, comprising:
    a disk space allotment unit which undertakes to reorganize multiple sectors on a data storage device according to an allotment instruction input by a user for allotment of disk space to newly defined working data section, sector index table, and duplicate data section; and
    a marking unit which is to update a data flag of a certain sector marked in the sector index table when data is written into the certain sector of the working data section, where the data flag is used to indicate whether write status of the certain sector is enabled; and
    an archiving unit which is to copy regular data saved in the certain sector of the working data section and associated data flag marked in the sector index table to a corresponding location in the duplicate data section.

2. The data protection device as claimed in claim 1, further comprising a data recovery unit which first checks the data flag of the certain sector marked in the sector index table before retrieving a data copy from the duplicate data section to restore the data to an original location in the working data section where the data is saved, and also to restore the data flag to an original value in the sector index table.

3. The data protection device as claimed in claim 1, wherein total number of sectors to be used by the working data section, the sector index table and the duplicate data section is defined by user instructions through an operation interface.

4. The data protection device as claimed in claim 1, wherein the archiving unit first checks the data flag of the certain sector marked in the sector index table before copying regular data from the working data section and associated data flag value from the sector index table to the corresponding location in the duplicate data section.

5. The data protection device as claimed in claim 2, wherein the data recovery unit is to check on the data flag of the certain sector marked in the sector index table before retrieving a copy of data from the duplicate data section and copying to the original location where the data are saved in the working data section, and restoring the data flag to the original value marked in the sector index table.

6. The data protection device as claimed in claim 1, wherein the data protection device further comprising an archiving interface, which is connected to a data backup device so that data kept in the data backup device can be accessed by the data protection device, and once multiple sectors of the data backup device are assigned to the duplicate data section, data are regularly copied to the data backup device by the archiving unit.

7. The data protection unit as claimed in claim 1, wherein the data protection device further comprising a disk space tracking unit, which is used to track remaining disk space and disk space used by the working data section, sector index table and duplicate data section.

8. The data protection device as claimed in claim 7, wherein the disk space tracking unit is consulted to confirm the disk space still remaining in the duplicate data section before the archiving unit starts to copy data into the duplicate data section.

9. The data protection device as claimed in claim 6, wherein the archiving interface is selected from the group consisting of small computer system interface (SCSI), fiber channel interface (FC), peripheral component interconnect (PCI), flash card interface, serial storage architecture (SSA), integrated device electronics (IDE), universal serial bus (USB), IEEE 1394, personal computer memory card international association (PCMCIA), serial ATA (SATA), and parallel ATA (PATA).

10. The data protection device as claimed in claim 6, wherein the data backup device is a storage medium selected from the group consisting of hard disk, optical disk burner, ZIP disk drive, MO disk, tape drive, and card reader.

11. A method of securing data in a data storage device with multiple sectors, comprising the steps of:
    allotting disk space composed of multiple sectors to create a working data section, a sector index table and a duplicate data section;
    updating a data flag of a certain sector marked in the sector index table when data are saved in the certain sector of the working data section, where the data flag is used to indicate whether the certain sector is write enabled; and copying data saved in the certain sector, according to the data flag marked in the sector index table, from the working data section to the duplicate data section, together with a copy of the data flag in the sector index table.

12. The method of securing data as claimed in claim 11, wherein the method further includes restoring of the data previously saved in the duplicate data section to an original location in the working data section, by referencing the data flag in the sector index table, and changing the data flag back to an original value in the sector index table.

13. The method of securing data as claimed in claim 11, wherein the total number of sectors to be used by the working data section, the sector index table and the duplicate data section is defined by user instructions through an operation interface.

14. The method of securing data as claimed in claim 11, wherein the data copy saved in the duplicate data section is to include regular data copied from the certain sector of the working data section and associated data flag marked in the sector index table.

15. The method of securing data as claimed in claim 14, wherein data restoration from the duplicate data section in the case of data corruption is to include copying of regular data to an original location in the working data section, and resetting of data flag in the sector index table to an original value.

16. The method of securing data as claimed in claim 11, wherein the disk space left in the duplicate data section is confirmed before any new data are copied to the duplicate data section.

* * * * *